(12) United States Patent
Acero Acero et al.

(10) Patent No.: US 11,438,974 B2
(45) Date of Patent: Sep. 6, 2022

(54) INDUCTION COOKTOP DEVICE

(71) Applicant: BSH Hausgeräte GmbH, Munich (DE)

(72) Inventors: Jesus Acero Acero, Saragossa (ES); Manuel Almolda Fandos, Saragossa (ES); Pablo Jesus Hernandez Blasco, Saragossa (ES); Sergio Llorente Gil, Saragossa (ES); Ignacio Lope Moratilla, Saragossa (ES); Maria Elena Moya Albertin, Saragossa (ES); Javier Serrano Trullen, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 521 days.

(21) Appl. No.: 16/477,908

(22) PCT Filed: Mar. 12, 2018

(86) PCT No.: PCT/IB2018/051620
§ 371 (c)(1),
(2) Date: Jul. 15, 2019

(87) PCT Pub. No.: WO2018/178788
PCT Pub. Date: Oct. 4, 2018

(65) Prior Publication Data
US 2020/0128631 A1 Apr. 23, 2020

(30) Foreign Application Priority Data
Mar. 30, 2017 (ES) ............... ES201730497

(51) Int. Cl.
*H05B 6/12* (2006.01)
*H05B 6/06* (2006.01)
*H05B 6/44* (2006.01)

(52) U.S. Cl.
CPC ............. *H05B 6/1272* (2013.01); *H05B 6/44* (2013.01); *H05B 2213/03* (2013.01)

(58) Field of Classification Search
CPC .............. H05B 2213/03; H05B 6/1245; H05B 6/1272; H05B 6/44; Y02B 40/00
(Continued)

(56) References Cited

U.S. PATENT DOCUMENTS 6,144,019 A * 11/2000 Garcia ................. H05B 6/1281
219/624
2008/0164249 A1 * 7/2008 Gil .......................... H05B 6/062
219/620

(Continued)

FOREIGN PATENT DOCUMENTS

JP         H114577 A      2/1999
JP         2008188159 A   8/2008
(Continued)

OTHER PUBLICATIONS

International Search Report PCT/IB2018/051620 dated Jun. 28, 2018.

*Primary Examiner* — Quang T Van
(74) *Attorney, Agent, or Firm* — Michael E. Tschupp; Andre Pallapies; Brandon G. Braun (57) ABSTRACT

An induction cooktop device includes a cooktop plane and an induction heating unit that includes an induction heating element, with the induction heating element extending at least in a subarea along a first principal plane of orientation which deviates from the cooktop plane. The induction heating element includes a first section extending at least essentially within a second principal plane of orientation, and a second section extending at least essentially within a third principal plane of orientation which differs from the second principal plane of orientation.

17 Claims, 9 Drawing Sheets

(58) Field of Classification Search
USPC ....... 219/622, 600, 601, 620, 624, 625, 662,
219/664, 670, 675, 483, 489, 443.1, 460.1
See application file for complete search history.

(56) References Cited

U.S. PATENT DOCUMENTS

2010/0176116 A1    7/2010  Lee et al.
2018/0368214 A1*  12/2018  Acero Acero ........... H05B 6/44

FOREIGN PATENT DOCUMENTS

| JP | 2014096243 A | 5/2014 |
|---|---|---|
| WO | 2010148546 A1 | 12/2010 |

* cited by examiner

INDUCTION COOKTOP DEVICE

CROSS-REFERENCES TO RELATED APPLICATIONS

This application is the U.S. National Stage of International Application No. PCT/IB2018/051620, filed Mar. 12, 2018, which designated the United States and has been published as International Publication No. WO 2018/178788 A1 and which claims the priority of Spanish Patent Application, Serial No. P201730497, filed Mar. 30, 2017, pursuant to 35 U.S.C. 119(a)-(d).

BACKGROUND OF THE INVENTION

The invention relates to an induction cooktop device and a method for producing an induction cooktop device.

An induction cooktop device with a multiplicity of overlapping induction heating elements is already known from European patent application EP 1 858 300 A1. The induction heating elements are arranged one above the other in a multiplicity of planes. In each of the planes a part of the induction heating elements is arranged in the form of a matrix coplanar relative to each other.

BRIEF SUMMARY OF THE INVENTION

The object of the invention is in particular to provide a generic induction cooktop device with improved properties in respect of power output and efficiency.

The invention is based on an induction cooktop device with at least one induction heating unit, which comprises at least one induction heating element and with at least one cooktop plane.

It is recommended that the at least one induction heating element extends, at least in a subarea, along a first principal plane of orientation which deviates from the cooktop plane. By means of the inventive embodiment a generic induction cooktop device can advantageously be further developed. The at least one induction heating unit can be arranged with further induction heating units in a particularly compact overlapping manner.

An "induction cooktop device" should in particular be understood to mean at least a part, in particular a subassembly, of an induction cooktop. The induction heating element is in particular provided to generate an electromagnetic alternating field in particular with a frequency in a range from 20 kHz to 100 kHz, which in particular is provided to be converted into heat, in an in particular metallic, preferably ferromagnetic cookware base positioned thereupon, by means of eddy current induction and/or demagnetization effects. In particular the induction cooktop device has at least four, in particular at least six, advantageously at least eight, particularly advantageously at least ten, preferably at least twelve and particularly preferably a multiplicity of induction heating elements (n).

The "principal plane of orientation" of an object should in particular be understood to mean a plane which is parallel to a largest lateral face of a smallest, in particular notional, geometric cuboid, which only just completely encloses the object, and which in particular runs through the central point of the cuboid. A "longitudinal orientation" of an object should in particular be understood to mean an orientation of the object along a longitudinal orientation direction of the object. A "longitudinal orientation direction" of an object should in particular be understood to mean a direction which is oriented parallel to a longest side of a smallest notional geometric cuboid which only just completely encloses the object. An "orientation" of an object should in particular be understood to mean a maximum distance of two points on a perpendicular projection of the object onto one plane. The word "provided" should in particular be understood to mean specially programmed, designed and/or equipped. That an object is provided for a particular function should in particular be understood to mean that the object fulfills and/or performs this particular function in at least one usage and/or operating status.

Viewed perpendicularly to at least one principal plane of orientation of at least one of the induction heating elements, the induction heating elements could for example have an at least essentially polygonal form, such as for example an at least essentially rectangular and/or square and/or n-cornered form. Viewed perpendicularly to at least one principal plane of orientation of at least one of the induction heating elements, the induction heating elements advantageously have an at least essentially oval form. Viewed perpendicularly to at least one principal plane of orientation of at least one of the induction heating elements, the induction heating elements could have an at least essentially circular form. Alternatively or additionally, viewed perpendicularly to at least one principal plane of orientation of at least one of the induction heating elements, the induction heating elements could have an at least essentially elliptical form. Particularly advantageously the induction heating element embodies at least one heat conductor. The cooktop plane is in particular defined by a cooktop hotplate. In other words, the cooktop hotplate extends along the cooktop plane. In an assembled state, the cooktop hotplate is in particular provided for the positioning of cookware. In this connection that the first principal plane of orientation deviates from the cooktop plane, should in particular understood to mean that the first principal plane of orientation runs obliquely or perpendicularly to the cooktop plane. In particular the principal plane of orientation does not run parallel to the cooktop plane. In this connection it is conceivable that the induction heating element extends completely in the first principal plane of orientation.

In a further embodiment of the invention it is recommended that at least one induction heating element has a first section and at least one second section, wherein the first section extends at least essentially within a second principal plane of orientation and the second section extends at least essentially within a third principal plane of orientation different from the second principal plane of orientation. A multiplicity of induction heating elements can thereby particularly be arranged compactly in relation to each other. At the same time a particularly high level of efficiency and uniform electromagnetic radiation can be achieved. It is additionally recommended that the at least one induction heating element has at least one third section, wherein the third section extends at least essentially within a fourth principal plane of orientation different from the second and third principal plane of orientation.

It is further recommended that the second principal plane of orientation and the third principal plane of orientation run at least essentially parallel to each other. The induction cooktop device can thereby achieve a particularly high level of efficiency. Further advantageously, the induction heating element is embodied in one piece and/or from one piece of material. In this connection "at least essentially" should in particular be understood to mean a variance of a maximum of 20°, preferably a maximum of 5° and particularly preferably a maximum of 0.5°.

It is furthermore recommended that the induction heating unit comprises at least one first heating element support, on which the at least one induction heating element is arranged at least in certain areas. A particularly high level of stability and simple assembly can thereby be achieved. The heating element support preferably comprises a mica plate and/or a circuit board. The circuit board could in particular have at least one layer, on which the induction heating elements are arranged. Advantageously the circuit board could have at least two and preferably at least three layers, on which the induction heating elements are in particular arranged. In particular the induction heating elements could be imprinted on the circuit board and in particular on layers of the circuit board.

It is further recommended that the at least one subarea is arranged between the first section and the second section. The induction heating unit can thereby be manufactured and assembled in a particularly simple manner. The first principal plane of orientation preferably runs obliquely to the second principal plane of orientation and/or to the third principal plane of orientation. Particularly advantageously an angle between the first principal plane of orientation and the second principal plane of orientation and/or the third principal plane of orientation is at least essentially 45°. In particular the induction heating element has an at least essentially double-bend and/or S-shaped cross-section in the subarea.

It is further recommended that the induction cooktop device comprises at least one further induction heating unit with at least one further induction heating element, which has a further first section and at least one further second section, wherein the further first section extends at least in an operating status at least essentially within the second principal plane of orientation and the second section extends at least essentially within the third principal plane of orientation. A particularly compact structure and a high level of efficiency of the induction cooktop device can thereby be achieved.

It is also recommended that, viewed in a direction perpendicular to the second principal plane of orientation, the at least one induction heating element and the at least one further induction heating element partially overlap. In particular the further first section of the further induction heating element at least partially and advantageously overlaps the second section of the at least one induction heating element at least for the most part. Here, "at least for the most part" should in particular be understood to mean to the extent of at least 70%, in particular at least 80%, advantageously at least 90% and preferably at least 95%. Particularly advantageously a matrix cooktop can be equipped with at least one inventive induction cooktop device.

A method for producing an induction cooktop device is further proposed, wherein in at least one method step a first section of an induction heating element of an induction heating unit is subjected to at least one first force component perpendicular to a principal plane of orientation of the induction heating unit, by means of which a principal plane of orientation of the first section is displaced relative to a principal plane of orientation of a second section of the induction heating element of the induction heating unit. A particularly simple and cost-effective production of the induction cooktop device can thereby take place. In particular a second force component acts upon the second section in an antiparallel manner to the first force component. Particularly advantageously the induction heating unit is bent and/or permanently plastically deformed at least in certain areas. It is additionally recommended that in at least one method step the induction heating element of the induction heating unit is folded and/or bent, in a two-fold manner, advantageously into a double-bend and/or S-shaped form. Particularly simple manufacture of the induction heating unit can thereby be achieved.

It is additionally recommended that in at least one method step an insulation layer of the induction heating unit is severed, in particular severed in a controlled manner, in particular in an intermediate section arranged between the first section and the second section.

The induction cooktop device should here not be limited to the application and embodiment described above. In particular the induction cooktop device can have a number of individual elements, components and units diverging from the number cited herein, in order to fulfill a method of operation herein described.

Further advantages emerge from the following description of the drawing. The drawing shows exemplary embodiments of the invention. The drawing, the description and the claims contain numerous features in combination. The person skilled in the art will expediently also consider the features individually, and put them together into sensible further combinations.

BRIEF DESCRIPTION OF THE DRAWINGS

Wherein.

DETAILED DESCRIPTION OF EXEMPLARY EMBODIMENTS OF THE PRESENT INVENTION

Figure 1:
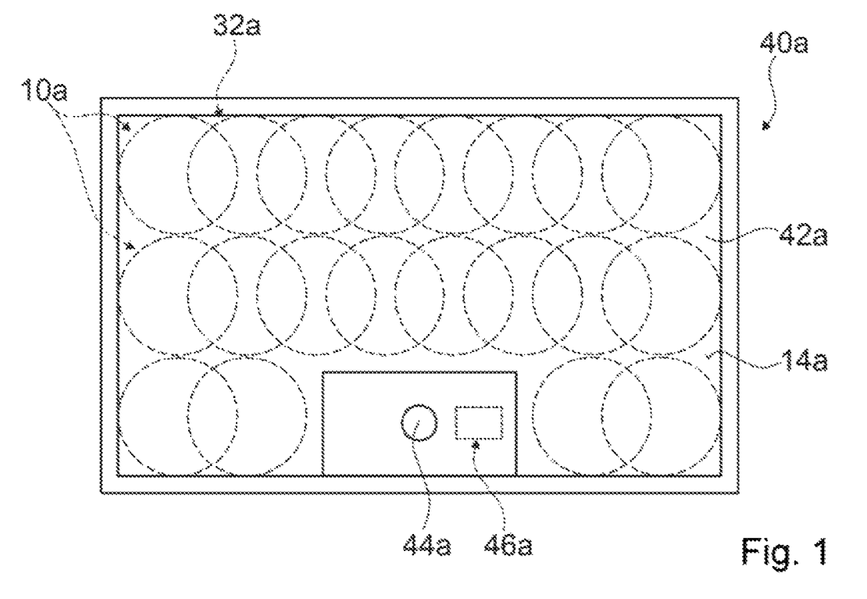
FIG. 1 shows an induction cooktop with an induction cooktop device in a schematic top view.

FIG. 1 shows an induction cooktop 40a with an induction cooktop device. The induction cooktop device has a cooktop hotplate 42a. In an assembled state the cooktop hotplate 42a embodies a part of an external cooktop housing, in particular of the induction cooktop 40a. In an installation position the cooktop hotplate 42a comprises a part of the external cooktop housing facing towards an operator. In an assembled state the cooktop hotplate 42a is provided for the positioning of cookware.

The induction cooktop device has a user interface 44a for the entry and/or selection of operating parameters, for example of a heat output and/or of a heating power density and/or of a heating zone. The user interface 44a is provided for output of a value of an operating parameter to an operator. For example the user interface 44a could output the value of the operating parameter to an operator optically and/or acoustically.

The induction cooktop device has a control unit 46a. The control unit 46a is provided to perform actions and/or change settings depending on operating parameters entered by means of the user interface 44a.

The induction cooktop device has a multiplicity of overlapping induction heating units 10a, 32a. In the figures only a single example and one further example of objects present in multiple form are provided with a reference character.

In the present exemplary embodiment the induction heating units 10a, 32a, 48a are arranged in the form of a matrix. A matrix cooktop here has the induction cooktop device. In the present exemplary embodiment of the induction cooking device the induction heating units 10a, 32a, 48a have an essentially circular form viewed perpendicularly to a cooktop plane 14a.

The induction cooktop device could for example have at least one further induction heating unit (not shown) in addition to the overlapping induction heating units 10a, 32a, 48a, which in particular could be arranged without overlap in relation to the overlapping induction heating units 10a, 32a, 48a.

The induction heating units 10a are provided to heat cookware positioned on the cooktop hotplate 42a over the induction heating units 10a. In an operating status the induction heating units 10a, which in particular are activated, produce a magnetic flux which in particular is provided for the heating of cookware placed thereupon. In an operating status the induction heating units 10a, which in particular are activated, feed energy to the positioned cookware, in particular by means of the magnetic flux. In an operating status, the control unit 46a regulates energy input to the in particular activated induction heating units 10a, 32a, 48a. In an assembled status, the induction heating units 10a are arranged underneath the cooktop hotplate 42a.

Figure 2A:
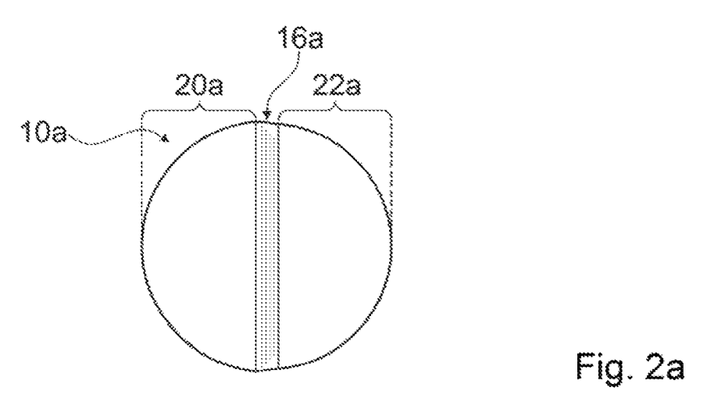
FIG. 2a shows an induction heating unit of the induction cooktop device in a schematic top view.
Figure 2B:
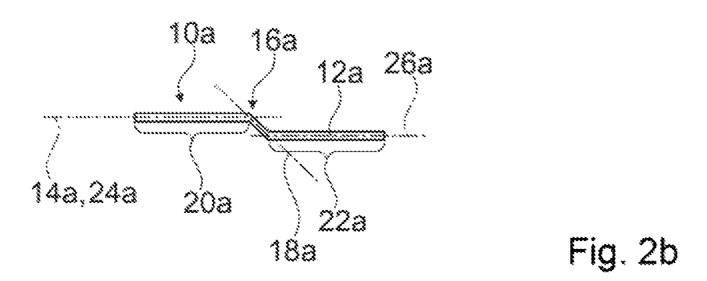
FIG. 2b shows the induction heating unit according to FIG. 2a in a schematic side view.

FIGS. 2a and 2b show for example one of the induction heating units 10a, 32a, 48a. The following description of the one induction heating unit can here be transferred to all other induction heating units. The induction cooktop device 10a comprises an induction heating element 12a. The induction heating element 12a comprises a heat conductor. The induction heating element 12a is embodied in one piece. For simpler representation the induction heating element 12a is shown as a disk. In fact, the induction heating element 12a takes the form of a wire wound into a spiral form. The induction heating element 12a extends in a subarea 16a along a first principal plane of orientation 18a. The first principal plane of orientation 18a deviates from the cooktop plane 14a. The first principal plane of orientation 18a forms an angle of about 45° to the cooktop plane 14a.

Figure 3A:
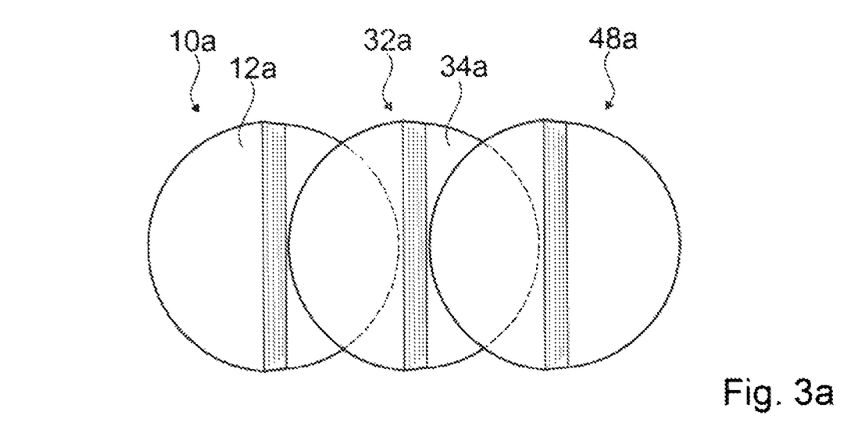
FIG. 3a shows three induction heating units of the induction cooktop device in a schematic top view.
Figure 3B:
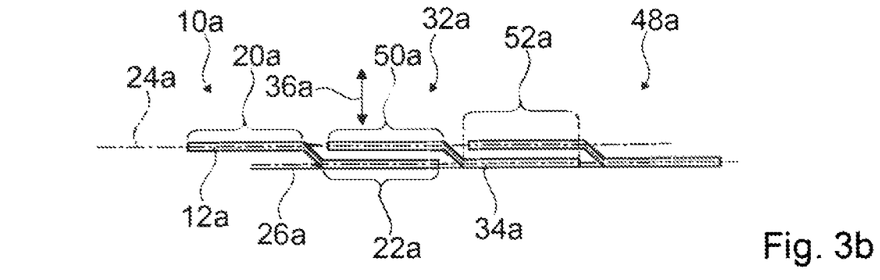
FIG. 3b shows the three induction heating units according to FIG. 3a in a schematic side view.

The induction heating element 12a has a first section 20a. The induction heating element 12a has a second section 22a. The first section 20a extends within a second principal plane of orientation 24a. The second section 22a extends within a third principal plane of orientation 26a. The third principal plane of orientation 26a is different from the second principal plane of orientation 24a. The second principal plane of orientation 24a and the third principal plane of orientation 26a run parallel to each other. The second principal plane of orientation 24a and the third principal plane of orientation 26a are offset parallel to each other. The first principal plane of orientation 18a extends parallel to the cooktop plane 14a. The subarea 16a is arranged between the first section 20a and the second section 22a. The first principal plane of orientation 18a runs obliquely to the second principal plane of orientation 24a. The first principal plane of orientation 18a runs obliquely to the third principal plane of orientation 26a. The first section 20a and the second section 22a are the same size. The first section 20a and the second section 22a have the same surface area, width and/or length. FIGS. 3a and 3b show the induction heating unit 10a and a further induction heating unit 32a of the induction cooktop device. A third induction heating unit 48a is further represented, which however is not described in greater detail because of its identical structure to induction heating units 10a, 32a.

The further induction heating unit 32a comprises a further induction heating element 34a. The further induction heating element 34a has a further first section 50a and a further second section 52a. In an operating status and/or in an assembled state, the further first section 50a extends within the second principal plane of orientation 24a. The further second section 52a extends within the third principal plane of orientation 26a. Viewed in a direction 36a perpendicular to the second principal plane of orientation 24a, the induction heating element 12a and the further induction heating element 34a partially overlap each other. In particular the further first section 50a of the further induction heating element 34a overlaps the second section 22a of the induction heating element 12a at least for the most part.

Figure 3C:
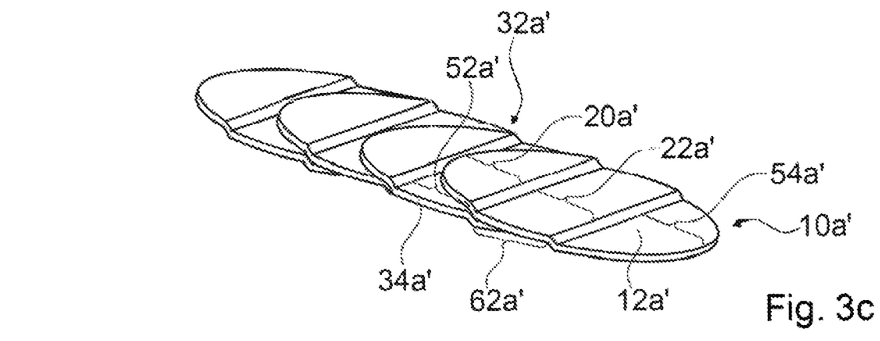
FIG. 3c shows three induction heating units of an alternatively embodied induction cooktop device in a schematic perspective representation.

In one variant of the invention, the induction heating element 12a' of the induction heating unit 10a' has a third section 54a' in addition to the first section 20a' and second section 22a'. The third section 54a' extends at least essentially within a fourth principal plane of orientation. The fourth principal plane of orientation extends in a different manner to the second and third principal plane of orientation 24a', 26a'. The second principal plane of orientation 24a', the third principal plane of orientation 26a' and the fourth principal plane of orientation run parallel to each other. The second principal plane of orientation 24a', the third principal plane of orientation 26a' and the fourth principal plane of orientation are arranged offset parallel to each other. Viewed in a direction 36a' perpendicular to the second principal plane of orientation 24a', the third principal plane of orientation 26a' is arranged between the second principal plane of orientation 24a' and the fourth principal plane of orientation. The induction heating element 12a' has two subareas 16a', which run along a first principal plane of orientation 18a' and a fifth principal plane of orientation, which both diverge from the cooktop plane 14a'. The first principal plane of orientation 18a' and the fifth principal plane of orientation run parallel to each other. The sections 20a', 22a', 54a' divide the induction heating element in at least one direction into three parts of equal length. As shown, a multiplicity of the induction heating elements 12a' overlap each other in such a way that the first section 20a' and the second section 22a' of an induction heating element 12a' overlap a further second section 54a' and a further third section 62a' of a further induction heating element 34a' of an induction heating unit 32a'.

Figure 3D:
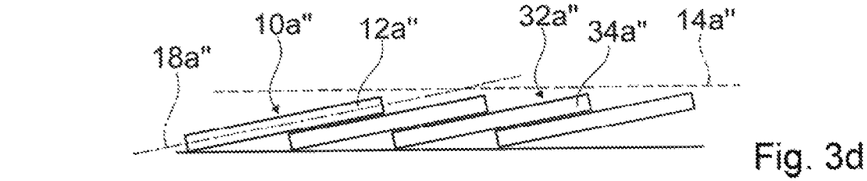
FIG. 3d shows three induction heating units of an alternatively embodied induction cooktop device in a schematic side view.

As in a variant shown in FIG. 3d it is also conceivable that the induction heating element 12a" extends not only along a first principal plane of orientation 18a", which deviates from the cooktop plane 14a". Instead, the induction heating element 12a" extends completely along a first principal plane of orientation 18a", which deviates from the cooktop plane 14a". In this case too, a multiplicity of induction heating elements 12a" can partially overlap. The induction heating elements 12a" are here obliquely layered relative to each other.

Figure 4A:
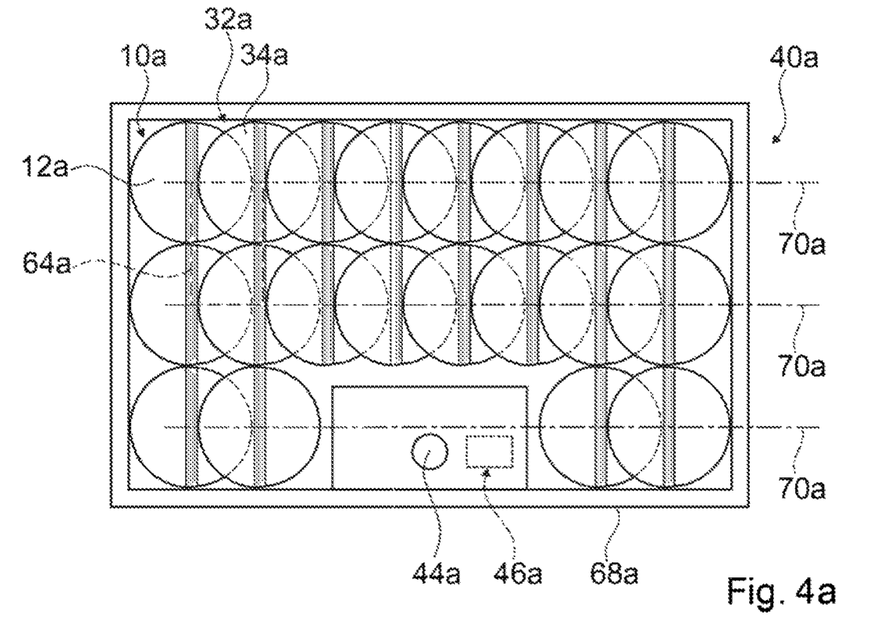
FIG. 4a shows the induction cooktop device in a schematic top view.

FIGS. 4a to 4e all show the cooktop hotplate 40a with different possible arrangements of the induction heating units 10a, 32a. In FIG. 4a the central points of all induction heating units 10a, 32a are arranged in a matrix. The induction heating units 10a, 32a are arranged in respective rows 70a behind and overlapping each other. There are no overlaps between two adjacent rows 70a. The rows 70a run parallel to a longest outer edge 68a of the cooktop hotplate 40a. The rows 70a run parallel to each other. Connecting four central points of the nearest induction heating units 10a, 32a to each other produces a rectangle 64a, whose length and width diverge from each other. A longest edge of the rectangle 64a runs perpendicular to the outer edge 68a.

Figure 4B:
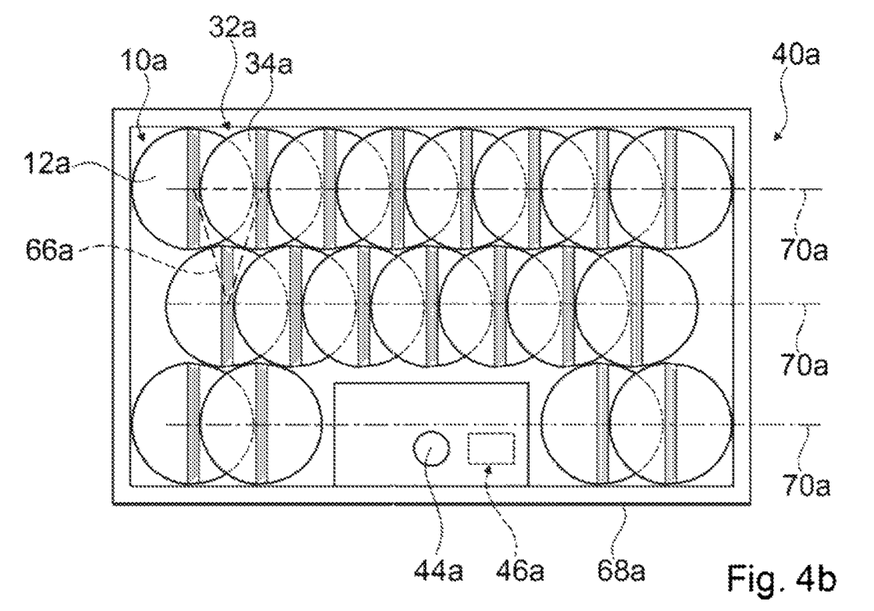
FIG. 4b shows an alternatively embodied induction cooktop device in a schematic top view.

In FIG. 4b the central points of all induction heating units 10a, 32a are arranged in rows 70a offset relative to each other. The induction heating units 10a, 32a in rows 70a are thus arranged behind and overlapping each other. There are no overlaps between two adjacent rows 70a. The rows 70a run parallel to a longest outer edge 68a of the cooktop hotplate 40a. The rows 70a run parallel to each other. Connecting three central points of the nearest induction heating units 10a, 32a to each other produces an isosceles triangle 66a. A base of the isosceles triangle 66a runs parallel to the rows 70a and/or to the outer edge 68a.

Figure 4C:
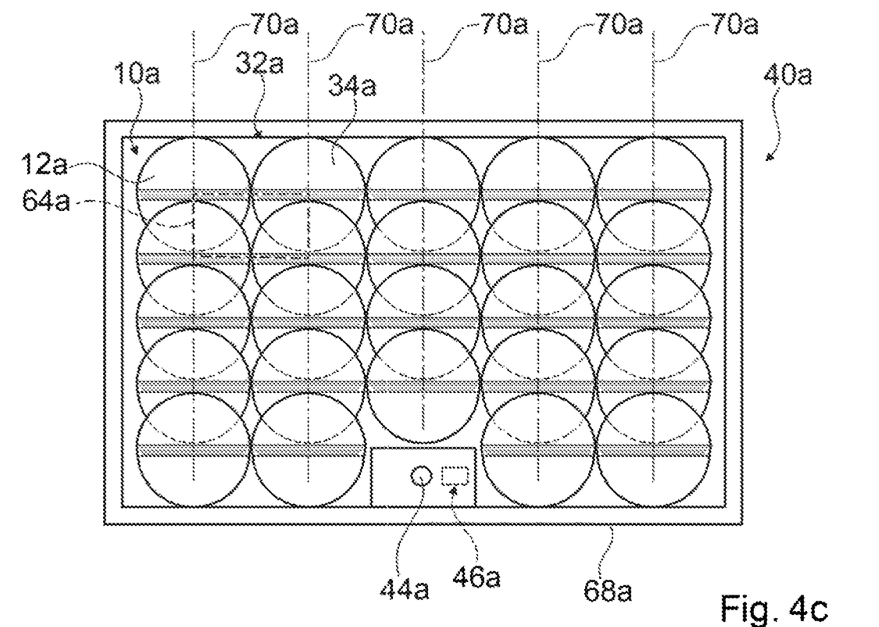
FIG. 4c shows an alternatively embodied induction cooktop device in a schematic top view.

In FIG. 4c the central points of all induction heating units 10a, 32a are arranged in a matrix. The induction heating units 10a, 32a are arranged in respective rows 70a behind and overlapping each other. There are no overlaps between two adjacent rows 70a. The rows 70a run perpendicular to a longest outer edge 68a of the cooktop hotplate 40a. The rows 70a run parallel to each other. Connecting four central points of the nearest induction heating units 10a, 32a to each other produces a rectangle 64a, whose length and breadth diverge from each other. A longest edge of the rectangle 64a runs parallel perpendicular to the outer edge 68a.

Figure 4D:
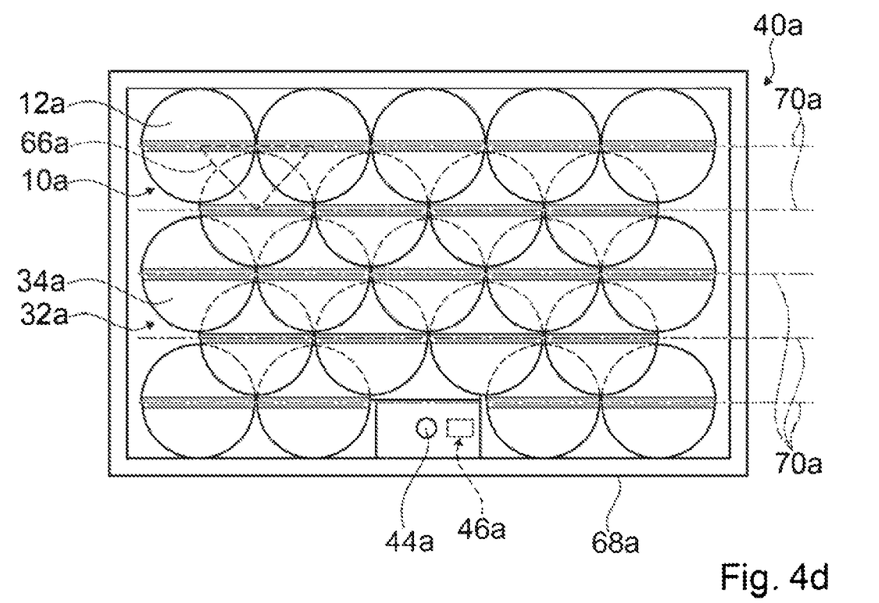
FIG. 4d shows an alternatively embodied induction cooktop device in a schematic top view.

In FIG. 4d the central points of all induction heating units 10a, 32a are arranged offset to each other in rows 70a. The induction heating units 10a, 32a are arranged in rows 70a and columns 72a behind and overlapping each other. There are likewise overlaps between two adjacent rows 70a. The rows 70a run parallel to a longest outer edge 68a of the cooktop hotplate 40a. The rows 70a run parallel to each other. Connecting three central points of the nearest induction heating units 10a, 32a to each other produces an isosceles and at least essentially right-angle triangle 66a. A base of the isosceles triangle 66a runs parallel to the rows 70a and/or to the outer edge 68a.

Figure 4E:
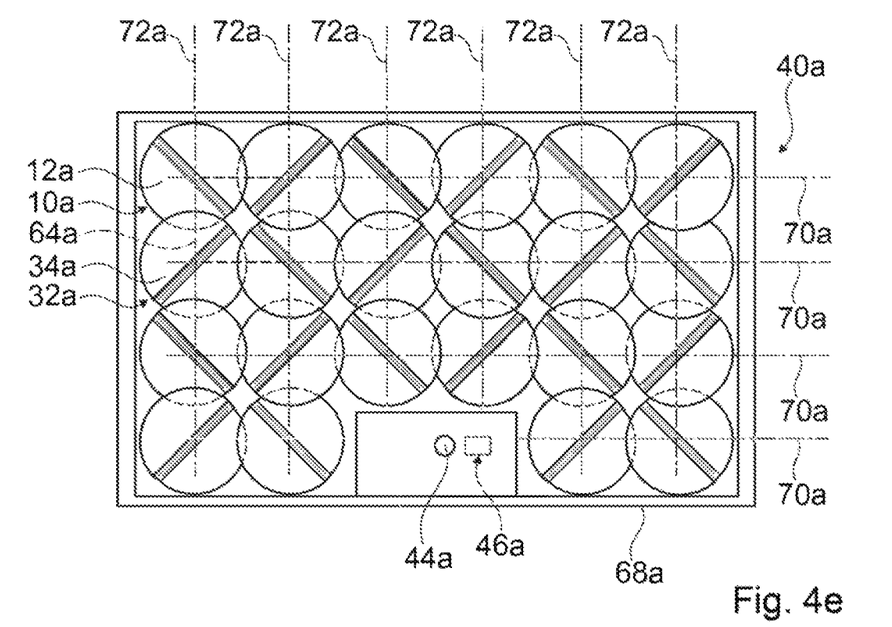
FIG. 4e shows an alternatively embodied induction cooktop device in a schematic top view.

In FIG. 4e the central points of all induction heating units 10a, 32a are arranged in a matrix. The induction heating units 10a, 32a are arranged in respective rows 70a and columns 72a behind and overlapping each other. The rows 70a and columns 72a form a square pattern. There are here overlaps of the induction heating units 10a, 32a between two adjacent rows 70a and columns 72a. The rows 70a run parallel to a longest outer edge 68a of the cooktop hotplate 40a. The columns 72a run perpendicular to a longest outer edge 68a of the cooktop hotplate 40a. The rows 70a run parallel to each other. The columns 72a run parallel to each other. Connecting four central points of the nearest induction heating units to each other 10a, 32a produces a square 64a.

Figure 4F:
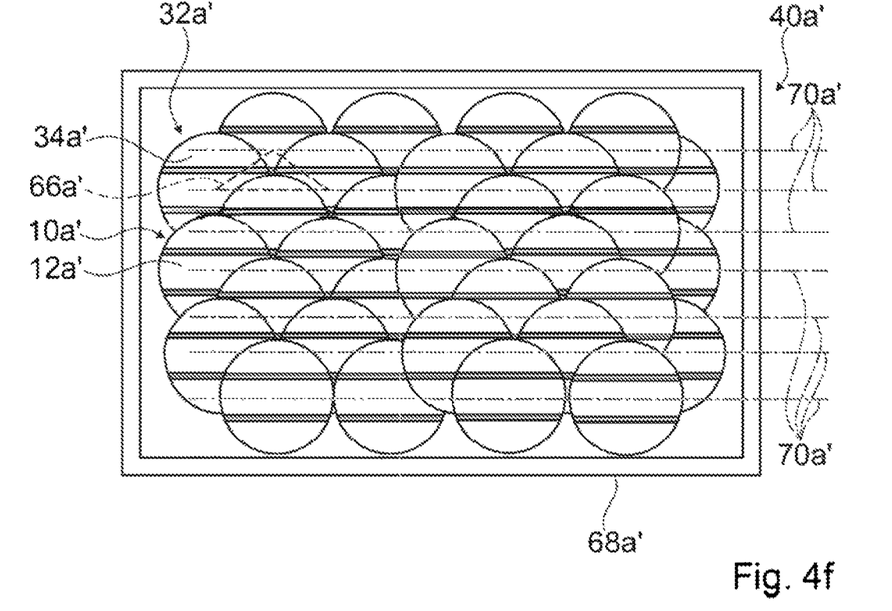
FIG. 4f shows an alternatively embodied induction cooktop device in a schematic top view.

FIG. 4f shows an alternatively embodied cooktop hotplate 40a' with a possible arrangement of the induction heating units 10a', 32a' shown in FIG. 3c. The induction heating units 10a, 32a are arranged in rows 70a' and columns 72a' behind and overlapping each other. There are here likewise overlaps between two adjacent rows 70a'. The rows 70a' run parallel to a longest outer edge 68a' of the cooktop hotplate 40a'. The rows 70a' run parallel to each other. Connecting three central points of the nearest induction heating units 10a', 32a' to each other produces an isosceles and at least essentially right-angle triangle 66a'. A base of the isosceles triangle 66a' runs parallel to the rows 70a' and/or to the outer edge 68a'.

Figure 5A:
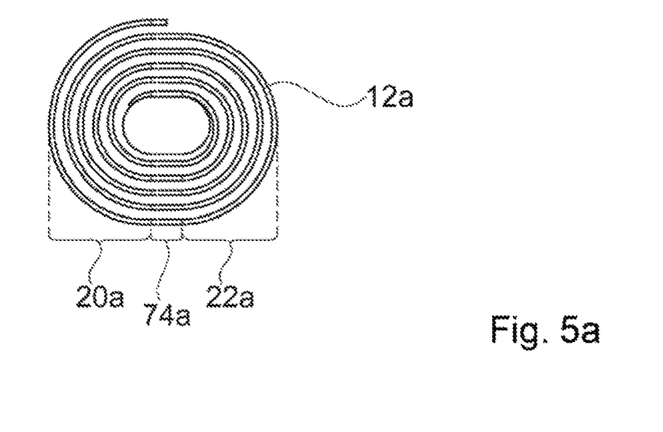
FIG. 5a shows an induction heating element of an induction heating unit in a schematic top view.

The induction heating element 12a of the induction heating unit 10a is shown in greater detail in FIG. 5a. The induction heating element 12a is wound and/or bent in the shape of a spiral and/or coil. The induction heating element 12a runs in a straight line in the flexure area 74a. Different windings of the induction heating element 12 run parallel to each other in the flexure area 74a. In a method described below the flexure area 74a is reshaped into the subarea 16a as already described.

Figure 5B:
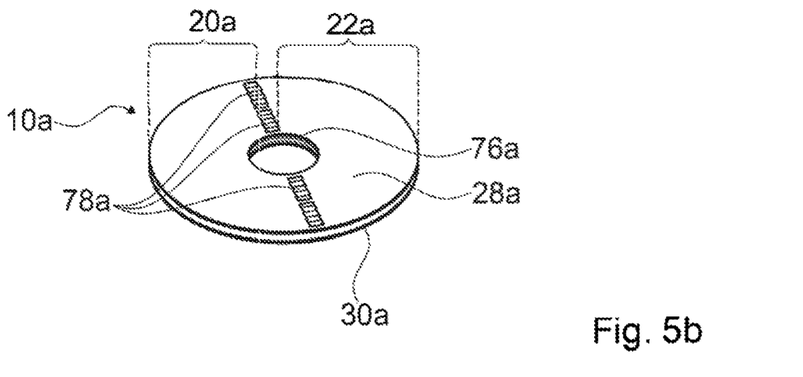
FIG. 5b shows a heating element support of an induction heating unit before a bending procedure in a schematic perspective representation.

As shown in FIG. 5b, the induction heating unit 10a comprises a first heating element support 28a. The heating element support 28a embodies a disk. The heating element support 28a is embodied from a material which appears sensible to the person skilled in the art, such as in particular plastic and/or a mica material. In its center, the heating element support 28a has a recess 76a. The recess 76a is embodied in a continuous form. The recess 76a is embodied in circular form. The recess 76a is punched out of the heating element support 28a. The heating element support 28a has further recesses 78a along the flexure areas 74a. The further recesses 78a are punched out of the heating element support 28a. The further recesses 78a embody a predetermined breaking point of the heating element support 28a. The induction heating unit 10a furthermore comprises a second heating element support 30a. The second heating element support 30a is embodied in structurally identical form to the first heating element support 28a. The heating element supports 28a, 30a are arranged one above the other in a congruent manner. The induction heating element 12a is arranged between the heating element supports 28a, 30a. The induction heating element 12a is at least in certain areas arranged on the first heating element support 28a. The induction heating element 12a is at least in certain areas arranged on the second heating element support 30a. The heating element supports 28a, 30a and the induction heating element 12a embody a sandwich structure.

Figure 5C:
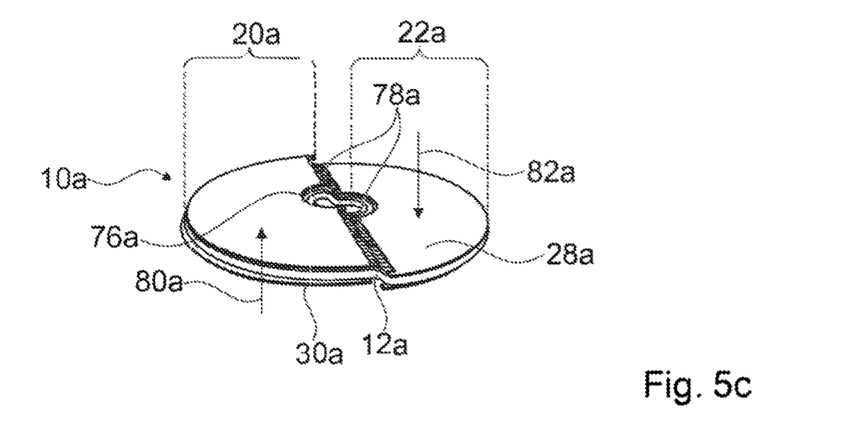
FIG. 5c shows the heating element support and the induction heating element after a bending procedure in a schematic perspective representation.
Figure 5D:
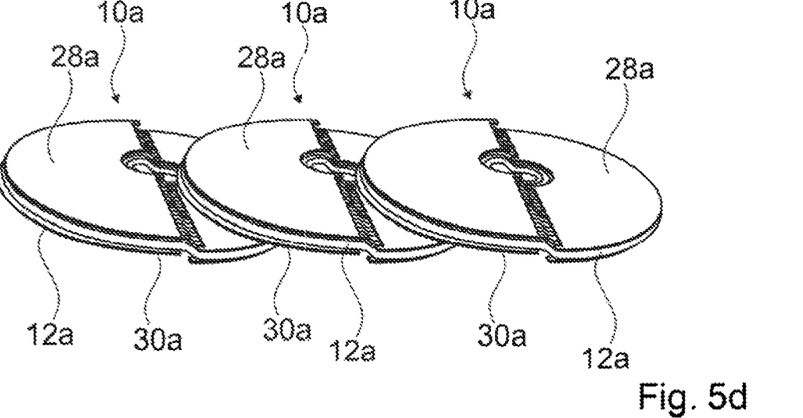
FIG. 5d shows an arrangement of a multiplicity of induction heating units in a schematic perspective representation.

In one method step of a method for producing an induction cooktop device, the first section 20a of the induction heating element 12a of the induction heating unit 10a is subjected to at least one first force component 80a perpendicular to a principal plane of orientation 18a of the induction heating unit 10a. The force component 80a here acts upon one of the heating element supports 28a, 30a. In this case the force component 80a is exerted on the second heating element support 30a. A force component 82a opposing the force component 80a acts upon the induction heating element 12a of the induction heating unit 10a in the second section 22a via the first heating element support 28a. At least as a result of the first force component 80a the principal plane of orientation 24a of the first section 20a is displaced relative to a principal plane of orientation 26a of the second section 22a of the induction heating unit 10a. The heating element supports 28a, 30a here fracture along their predetermined breaking points. The induction heating element 12a is bent and/or permanently plastically deformed in certain areas. To be more precise, the induction heating unit 10a is folded and/or bent in a two-fold manner. The induction heating element 12a is here bent into a double-bend and/or S-shaped form. The heating element supports 28a, 30a embody an insulation layer. This insulation layer is severed, in particular in a controlled manner, in an intermediate section arranged between the first section 20a and the second section 22a. The induction heating units 10a thus manufactured are finally arranged in mutually overlapping form, as for example shown in FIG. 5d.

FIGS. 6a to 7b show two further exemplary embodiments of the invention. The descriptions that follow restrict themselves essentially to the differences between the exemplary embodiments, wherein as regards components, features and functions which remain the same, reference can be made to the description of the other exemplary embodiments, in particular from FIGS. 1 to 5d. To distinguish the exemplary embodiments the alphabetic character a in the reference characters of the exemplary embodiment from FIGS. 1 through 5d is replaced by the alphabetic characters b and c in the reference characters of the exemplary embodiments from FIGS. 6a through 7b. As regards identically designated components, in particular in relation to components with the same reference characters, reference can also in principle be made to the drawings and/or the description of the other exemplary embodiments, in particular from FIGS. 1 and 5d.

Figure 6A:
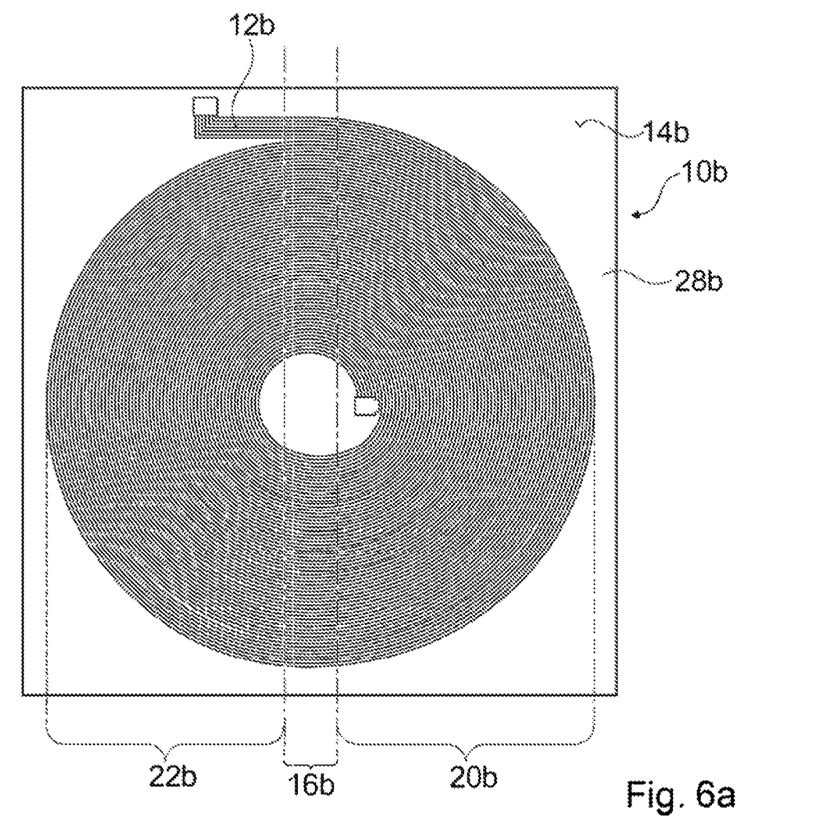
FIG. 6a shows an induction heating unit of a second exemplary embodiment of an induction cooktop device in a schematic top view.
Figure 6B:
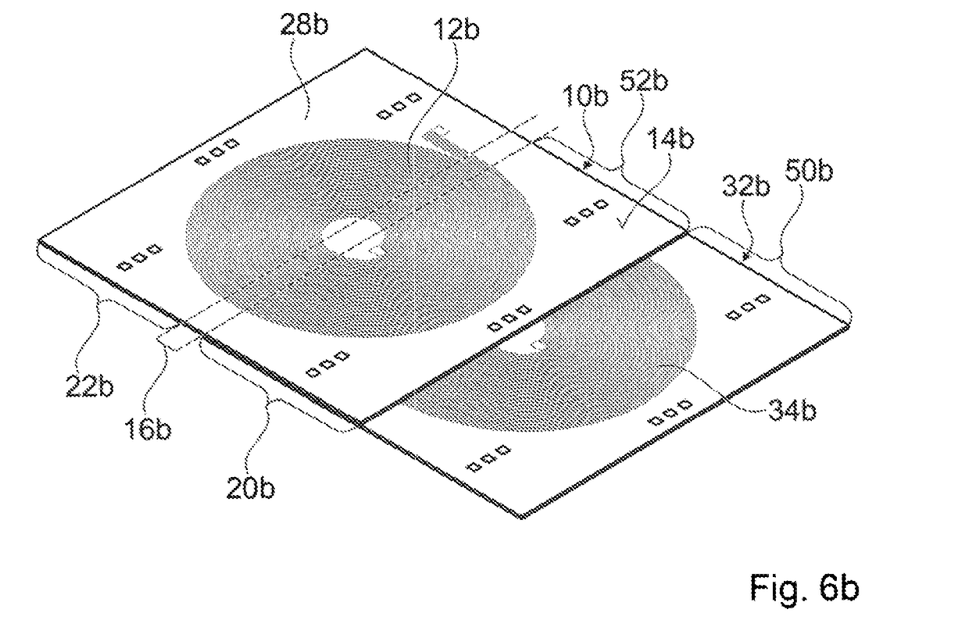
FIG. 6b shows two induction heating units of the second exemplary embodiment of the induction cooktop device in a schematic perspective representation.
Figure 6C:
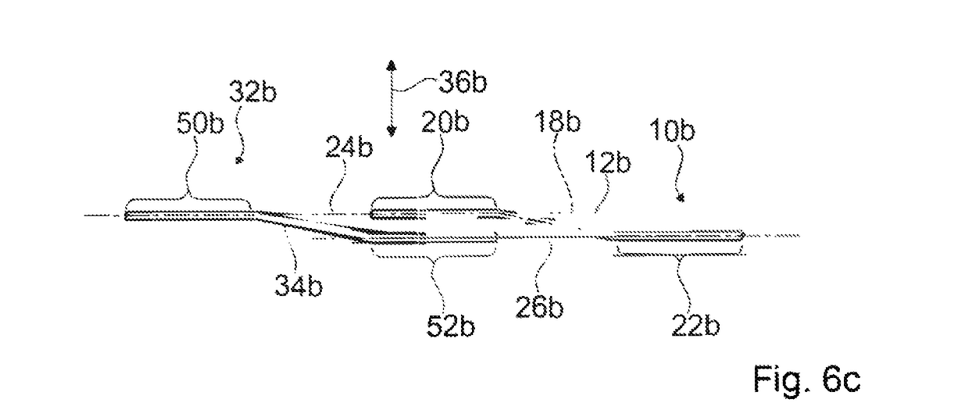
FIG. 6c shows the two induction heating units according to FIG. 6b in a schematic side view.

The FIGS. 6a and 6b show an induction heating unit 10b of a second exemplary embodiment of an induction cooktop device. The induction heating unit 10b comprises an induction heating element 12b. The induction cooktop device has a cooktop plane 14b. As shown in FIG. 6c in exaggerated form and not to scale, the induction heating element 12b extends at least in a subarea 16b along a first principal plane of orientation 18b, which deviates from the cooktop plane 14b. The induction heating element 12b has a first section 20b and a second section 22b. The first section 20b extends within a second principal plane of orientation 24b. The second section 22b extends within a third principal plane of orientation 26b which differs from the second principal plane of orientation 24b. An offset between the principal planes of orientation 24b, 26b is relatively small, for which reason it cannot be discerned in FIGS. 6a and 6b is and is represented in greatly exaggerated form in FIG. 6c. The subarea 16b is arranged between the first section 20b and the second section 22b.

As further shown in FIG. 6c, the second principal plane of orientation 24b and the third principal plane of orientation 26b run parallel to each other. The induction heating unit 10b comprises a first heating element support 28b. The heating element support 28b is shown only in the FIGS. 6a and 6b and for the sake of clarity is not represented in FIG. 6c. The heating element support 28b comprises a circuit board. The induction heating element 12b is arranged on the heating element support 28b. Grooves and/or channels are set into the heating element support 28b to accommodate the induction heating element 12b. The induction heating element 12b is imprinted on the heating element support 28b or applied using another method appearing sensible to the person skilled in the art.

As shown in greater detail in FIG. 6b, the induction cooktop device comprises a further induction heating unit 32b with at least one further induction heating element 34b, which has a further first section 50b and at least one further second section 52b. In an operating status the further first section 50b extends within the second principal plane of orientation 24b and the second section 52b extends within the third principal plane of orientation 26b. Viewed in a direction 36b perpendicular to the second principal plane of orientation 24b, the induction heating element 12b and the further induction heating element 34b partially overlap each other.

Figures 7A, 7B:
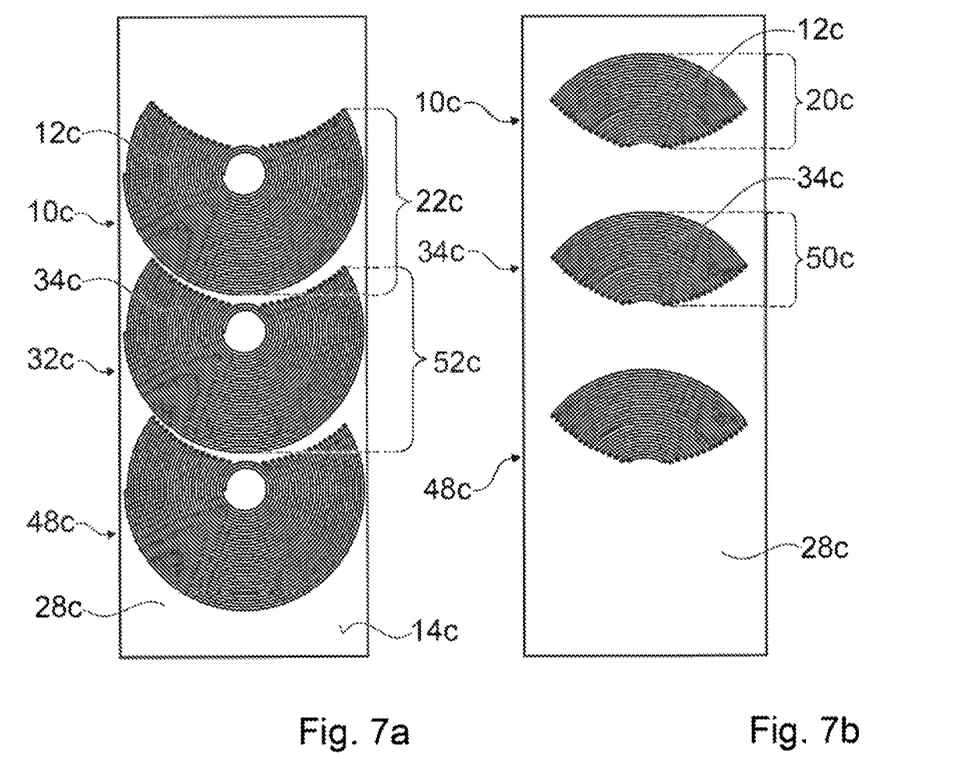
FIG. 7a shows three induction heating units of a third exemplary embodiment of the induction cooktop device in a schematic top view.
FIG. 7b shows the three induction heating units according to FIG. 7a in a schematic lower view and FIG. 7c shows the three induction heating units according to FIG. 7a in a schematic cutaway representation.
Figure 7C:
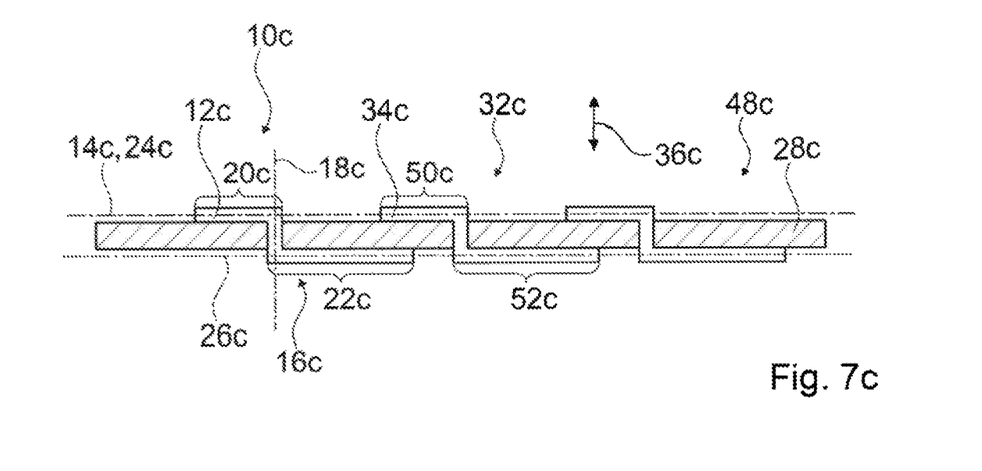

FIGS. 7a and 7b show an induction heating unit 10c of a third exemplary embodiment of an induction cooktop device. The induction heating unit 10c comprises an induction heating element 12c. The induction cooktop device has a cooktop plane 14c. As shown in FIG. 7c in a schematic cutaway representation, the induction heating element 12c extends at least in a subarea 16c along a first principal plane of orientation 18c, which deviates from the cooktop plane 14c. The first principal plane of orientation 18c runs perpendicularly to the cooktop plane 14c. The induction heating element 12c has a first section 20c and a second section 22c. The first section 20c extends within a second principal plane of orientation 24c. The second section 22c extends within a third principal plane of orientation 26c different to the second principal plane of orientation 24c. The subarea 16c is arranged in an overlapping area of the first section 20c and of the second section 22c.

As further shown in FIG. 7c, the second principal plane of orientation 24c and the third principal plane of orientation 26c run at least essentially parallel to each other. The induction heating unit 10c comprises a first heating element support 28c. The heating element support 28c embodies a circuit board. The induction heating element 12c is arranged on the heating element support 28c. Grooves and/or channels are set into the heating element support 28c to accommodate the induction heating element 12c. The induction heating element 12c is imprinted on the heating element support 28c or applied using another method appearing sensible to the person skilled in the art. In the first section 20c the induction heating element 12c runs on a first side of the heating element support 28c. In the second section 22c the induction heating element 12c runs on a second side of the heating element support 28c. The first side of the heating element support 28c and the second side of the heating element support 28c face away from each other. It is in principle conceivable that the heating element support 28c comprises three and/or a multiplicity of layers, in which the induction heating element 12c is arranged. In subarea 16c the induction heating element 12c passes through the heating element support 28c from one side to the other. Viewed perpendicularly to the cooktop plane 14c the subarea 16c runs in a crescent shape.

As shown in the FIGS. 7a and 7b, a multiplicity of induction heating units 10c, 32c, 48c, are arranged one after the other on the heating element support 28c. In this connection it is however also conceivable that each induction heating unit 10c, 32c, 48c is arranged on a separate heating element support 28c. A further induction heating unit 32c of the induction heating units 10c, 32, 48c has a further induction heating element 34c, which has a further first section 50c and at least one further second section 52c. In an operating status, the further first section 50c extends within the second principal plane of orientation 24c and the second section 52c extends within the third principal plane of orientation 26c. Viewed in a direction 36c perpendicular to the second principal plane of orientation 24c, the induction heating element 12c and the further induction heating element 34c partially overlap each other.

The invention claimed is:

1. An induction cooktop device, comprising:
   a cooktop plane;
   a first induction heating unit including an induction heating element, said induction heating element extending at least in a subarea along a first principal plane of orientation which deviates from the cooktop plane, the induction heating element including a first section extending at least essentially within a second principal plane of orientation, and a second section extending at least essentially within a third principal plane of orientation which differs from the second principal plane of orientation; and
   a second induction heating unit including an induction heating element having a first section and a second section, wherein in an operating status the first section of the induction heating element of the second induction heating unit extends at least essentially within the second principal plane of orientation and the second section of the induction heating element of the second induction heating unit extends at least essentially within the third principal plane of orientation.

2. The induction cooktop device of claim 1, wherein the second principal plane of orientation and the third principal plane of orientation run at least essentially parallel to each other.

3. The induction cooktop device of claim 1, wherein the first induction heating unit comprises a heating element support, said induction heating element being arranged at least in one area on the heating element support.

4. The induction cooktop device of claim 1, wherein the subarea is arranged between the first section and the second section of the induction heating element of the first induction heating unit.

5. The induction cooktop device of claim 1, wherein viewed in a direction perpendicular to the second principal plane of orientation, the induction heating element of the first induction heating unit and the induction heating element of the second induction heating unit partially overlap.

6. A matrix cooktop, comprising an induction cooktop device, said induction cooktop device comprising a cooktop plane, and a first induction heating unit including an induction heating element, said induction heating element extending at least in a subarea along a first principal plane of orientation which deviates from the cooktop plane,
   wherein the induction heating element includes a first section extending at least essentially within a second principal plane of orientation, and a second section extending at least essentially within a third principal plane of orientation which differs from the second principal plane of orientation,
   wherein the induction cooktop device comprises a second induction heating unit which includes an induction heating element having a first section and a second section, wherein in an operating status the first section of the induction heating element of the second induction heating unit extends at least essentially within the second principal plane of orientation and the second section of the induction heating element of the second induction heating unit extends at least essentially within the third principal plane of orientation.

7. The matrix cooktop of claim 6, wherein the second principal plane of orientation and the third principal plane of orientation run at least essentially parallel to each other.

8. The matrix cooktop of claim 6, wherein the first induction heating unit comprises a heating element support, said induction heating element being arranged at least in one area on the heating element support.

9. The matrix cooktop of claim 6, wherein the subarea is arranged between the first section and the second section of the induction heating element of the first induction heating unit.

10. The matrix cooktop of claim 6, wherein viewed in a direction perpendicular to the second principal plane of orientation, the induction heating element of the first induction heating unit and the induction heating element of the second induction heating unit partially overlap.

11. A method for producing an induction cooktop device, said method comprising subjecting a first section of an induction heating element of an induction heating unit to a force component perpendicular to a principal plane of orientation of the induction heating unit, thereby displacing a principal plane of orientation of the first section relative to a principal plane of orientation of a second section of the induction heating element of the induction heating unit.

12. The method of claim 11, wherein the induction heating element of the induction heating unit is folded, when the first section of the induction heating element is subjected to the force component.

13. The method of claim 12, wherein the induction heating element of the induction heating unit is folded in a two-fold manner.

14. The method of claim 12, wherein the induction heating element of the induction heating unit is folded into a double-bend and/or S-shaped form.

15. The method of claim 11, further comprising subjecting a first section of an induction heating element of a second induction heating unit to a force component perpendicular to a principal plane of orientation of the second induction heating unit, thereby displacing a principal plane of orientation of the first section of the induction heating element of the second induction heating unit relative to a principal plane of orientation of a second section of the induction heating element of the second induction heating unit.

16. The method of claim 15, further comprising orienting the first section of the induction heating element of the second induction heating unit at least essentially within the principal plane of orientation and the first section of the induction heating element of the first induction heating unit.

17. The method of claim 16, further comprising orienting the second section of the induction heating element of the second induction heating unit at least essentially within the principal plane of orientation and the second section of the induction heating element of the first induction heating unit.

* * * * *